(12) United States Patent
Hasuo (10) Patent No.: US 9,545,728 B2
(45) Date of Patent: Jan. 17, 2017

(54) INDUSTRIAL ROBOT PROVIDED WITH BALANCER DEVICE

(71) Applicant: FANUC CORPORATION, Minamitsuru-Gun, Yamanashi (JP)

(72) Inventor: Takeshi Hasuo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 46 days.

(21) Appl. No.: 14/227,472

(22) Filed: Mar. 27, 2014

(65) Prior Publication Data

US 2014/0290414 A1    Oct. 2, 2014

(30) Foreign Application Priority Data

Mar. 29, 2013  (JP) .................................. 2013-072930

(51) Int. Cl.
*B25J 19/00* (2006.01)

(52) U.S. Cl.
CPC ....... *B25J 19/0012* (2013.01); *Y10T 74/20305* (2015.01)

(58) Field of Classification Search
CPC ........................... B25J 19/0012; B25J 19/0016
USPC ...................................................... 267/64.11
See application file for complete search history.

(56) References Cited

U.S. PATENT DOCUMENTS

| | | | |
|---|---|---|---|
| 510,267 A * | 12/1893 | Kelly | F16B 5/04 403/274 |
| 1,810,972 A * | 6/1931 | Lord | B60T 11/04 24/33 P |
| 4,025,280 A * | 5/1977 | Wilson | F21L 19/00 431/1 |
| 4,537,233 A | 8/1985 | Vroonland | |
| 4,753,128 A | 6/1988 | Bartlett et al. | |
| 2002/0162414 A1 | 11/2002 | Lundstrom | |
| 2011/0057674 A1 | 3/2011 | Weissacher | |
| 2011/0072930 A1 | 3/2011 | Bayer | |
| 2011/0271784 A1 | 11/2011 | Kang | |
| 2012/0186379 A1 | 7/2012 | Miyamoto | |

(Continued)

FOREIGN PATENT DOCUMENTS

| | | |
|---|---|---|
| CN | 102029607 | 4/2011 |
| DE | 228484 | 10/1985 |

(Continued)

OTHER PUBLICATIONS

German Office Action mailed Aug. 18, 2015 for German Application No. 10 2014 004 566.8, including English translation.
Decision to Grant for JP2013-072930 mailed Aug. 19, 2014.

*Primary Examiner* — William C Joyce
(74) *Attorney, Agent, or Firm* — RatnerPrestia (57) ABSTRACT

An industrial robot including a base part, an arm part, and a balancer device connected pivatably to the base part and the arm part to apply a repulsive force resisting a load acting on a pivot shaft due to gravity. The balancer device includes a balancer having a cylinder and a piston rod, end parts of the cylinder and the piston rod being pivatably connected with respect to the arm part and the base part, respectively, a coupling member attached to a support part of the base to support pivotably a balancer end part with respect to the support part, and a fastening part fastening a first end face formed at the coupling member and a second end face formed at the balancer end part to push the piston rod inside the cylinder by a fastening force.

11 Claims, 8 Drawing Sheets

(56) References Cited

U.S. PATENT DOCUMENTS

2013/0187022 A1\* 7/2013 Duportal ................ G01B 5/008
　　　　　　　　　　　　　　　　　　　　　　248/543

FOREIGN PATENT DOCUMENTS

| | | | |
|---|---:|---|---|
| DE | 229953 | | 11/1985 |
| EP | 0143134 | | 6/1985 |
| GB | 804655 | \* | 11/1958 |
| JP | 60-020891 | | 2/1985 |
| JP | 06-170780 | | 6/1994 |
| JP | 07-227791 | | 8/1995 |
| JP | 08-174469 | | 7/1996 |
| JP | 10044084 | | 2/1998 |
| JP | 10-138189 | | 5/1998 |
| JP | 10-225891 | | 8/1998 |
| JP | 31-42791 | | 8/1998 |
| JP | 11-216697 | | 8/1999 |
| JP | 36-73390 | | 8/1999 |
| JP | 11-277479 | | 10/1999 |
| JP | 11300679 | | 11/1999 |
| JP | 3-142791 B | | 3/2001 |
| JP | 2001-225293 | | 8/2001 |
| JP | 2002-283274 | | 10/2002 |
| JP | 3-673390 B | | 7/2005 |
| JP | 2006-15947 | \* | 1/2006 |

\* cited by examiner

INDUSTRIAL ROBOT PROVIDED WITH BALANCER DEVICE

BACKGROUND OF THE INVENTION

1. Field of the Invention

The present invention relates to an industrial robot which is provided with a balancer device which generates a force resisting a load due to gravity.

2. Description of the Related Art

In multiarticulated type industrial robots, there has been known an industrial robot, which is provided with a balancer which generates a force in an opposite direction to the direction of the load due to gravity so as to assist power of a servo motor for driving an arm. For example, Japanese Patent Unexamined Publication No. 10-138189A (JP10-138189A) describes a gas spring type of balancer which uses a compressible gas which is sealed inside of a cylinder so as to apply to a piston rod a repulsive force which corresponds to a change in posture of an arm.

In this regard, this type of balancer is attached in a state where the piston rod is pushed into the cylinder by a predetermined amount, so that even if the arm changes in posture, the piston rod will not reach the stroke end. However, when attaching the balancer, it is difficult to push in the piston rod by a predetermined amount against the gas force of the compressible gas.

On the other hand, there has been known a coil spring type of balancer, which interposes a coil spring inside the cylinder and applies a repulsive force generated by the spring force of the coil spring to a piston rod. For example, in Japanese Patent Examined Publication No. 3142791 (JP3142791B), a through hole is provided in the cylindrical face of a cylinder and a stopper member is protruded inside the cylinder through the through hole. This stopper member is used to hold the coil spring in the compressed state. The balancer is attached in the state with no repulsive force acting on the piston rod. In Japanese Patent Examined Publication No. 3673390 (JP3673390B), an opening part is provided in the end wall of a cylinder, a nut is screwed through the opening part onto an end part of a piston rod which is passed through a retainer, and the coil spring is compressed. The balancer is attached in a state without completely screwing in the nut and in a state where no repulsive force acts on the piston rod.

However, since the balancer described in JP3142791B or JP3673390B provides the cylinder with a through hole or opening part, while it can be applied to a coil spring type of balancer, it cannot be applied to a gas spring type of balancer wherein a compressible gas has to be sealed in.

SUMMARY OF THE INVENTION

According to one aspect of the present invention, an industrial robot includes a base part, an arm part connected pivotably through a pivot shaft to the base part, and a balancer device having one end part connected pivotably to the base part and the other end part connected pivotably to the arm part to apply a repulsive force resisting a load acting on the pivot shaft due to gravity. Further, the base part and arm part respectively have balancer support parts, and the balancer device includes a balancer having a cylinder and a piston rod to which a repulsive force is applied from inside the cylinder, a coupling member attached to at least one of the balancer support parts to support pivotably at least one of end parts of the cylinder and the piston rod constituting a balancer end part with respect to the balancer support part, and a fastening part fastening a first end face formed at the coupling member and a second end face formed at the balancer support part or the balancer end part to push the piston rod inside the cylinder by a fastening force.

BRIEF DESCRIPTION OF THE DRAWINGS

The objects, features, and advantages of the present invention will become clearer from the following description of embodiments in relation to the attached drawings, in which.

DETAILED DESCRIPTION

First Embodiment

Figure 1:
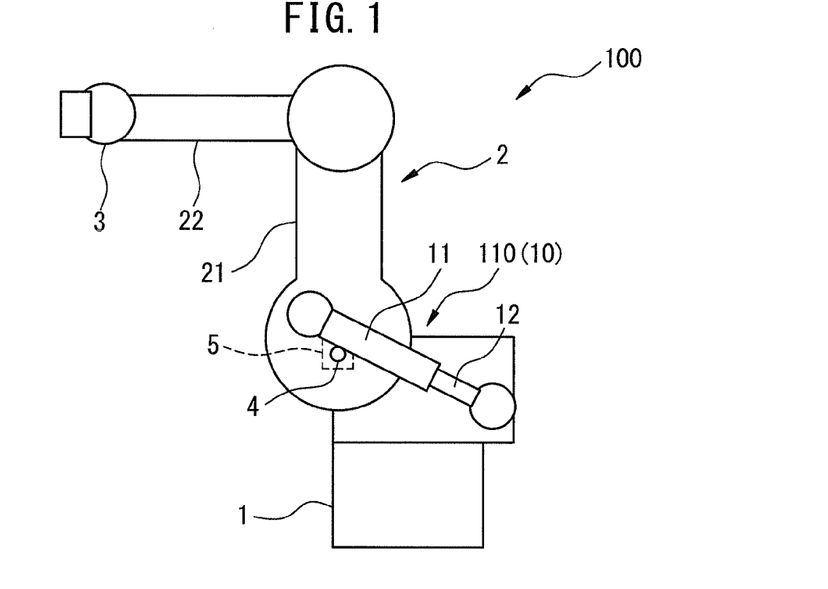
FIG. 1 is a side view which shows the schematic configuration of an industrial robot according to a first embodiment of the present invention.

Below, referring to FIG. 1 to FIG. 6, an industrial robot according to a first embodiment of the present invention will be explained. FIG. 1 is a side view which shows the schematic configuration of an industrial robot 100 according to the first embodiment of the present invention. The robot 100 which is shown in FIG. 1 is, for example, a vertical multiarticulated type robot which is provided with a base part 1 which is set on a floor surface, an arm part 2 which is connected pivotably to the base part 1 about a shaft part 4 which extends in a horizontal direction, and a balancer device 110 which applies a repulsive force which resists a load (torque) which acts on the shaft part 4 due to gravity.

The arm part 2 has a lower arm 21 which is connected pivotably to the base part 1 and extends in a vertical direction, and an upper arm 22 which is connected pivotably to an upper end part of the lower arm 21 and extends in the horizontal direction. A front end part of the upper arm 22 is provided with a wrist part 3. The shaft part 4 is connected with a servo motor 5. The servo motor 5 drives the arm part 2 to pivot in a vertical plane. The balancer device 110 has a balancer 10.

Figure 2A:
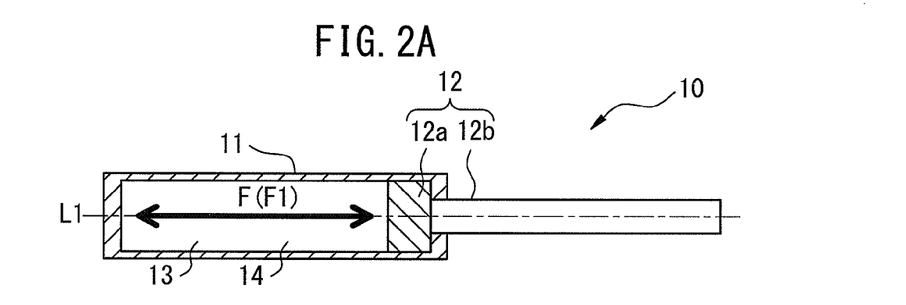
FIG. 2A is a cross-sectional view which shows an internal configuration of a balancer of FIG. 1 and a view which shows a natural length state of the balancer.
Figure 2B:
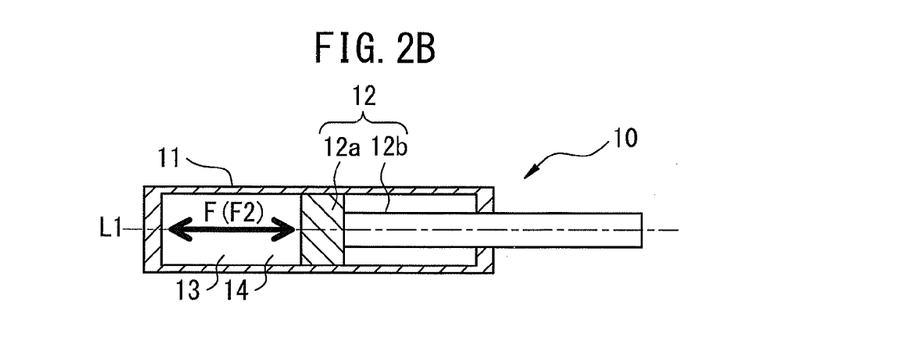
FIG. 2B is a cross-sectional view which shows an internal configuration of a balancer of FIG. 1 and a view which shows a state where the balancer contracts from the natural length state.

FIG. 2A and FIG. 2B are cross-sectional views which show the internal configuration of the balancer 10. FIG. 2A shows the state where the balancer 10 is extended to the maximum, i.e., the "natural length state", while FIG. 2B shows the state where the balancer 10 contracts by a predetermined amount from the natural length state. As shown in FIG. 2A and FIG. 2B, the balancer 10 has a cylindrically-shaped cylinder 11 centered about the axial line L1 and a piston rod 12 comprised of a piston 12a and a rod 12b which are integrally formed. The piston 12a can slide inside the cylinder 11 along the axial line L1.

Inside the cylinder 11, a hermetic space 13 is formed facing the piston 12a at the opposite side to the rod 12b. An inert compressible gas 14 (below, sometimes simply called a "gas") is sealed inside the hermetic space 13. The gas 14 gives the piston rod 12 a repulsive force F, as shown by the arrow. The piston rod 12 can move against the repulsive force F relative to the cylinder 11. Due to this, the balancer 10 can extend and contract along the axial line L1. The repulsive force F increases as the hermetic space 13 becomes smaller in volume. Therefore, at the natural length state where the piston 12a reaches the stroke end (FIG. 2A), the repulsive force F becomes the minimum F1 (>0). The repulsive force F2 of FIG. 2B is larger than the repulsive force F1 of FIG. 2A.

As shown in FIG. 1, one end part of the balancer device 110 (end part of piston rod 12) is pivotably connected with the base part 1, while the other end part (end part of cylinder 11) is pivotably connected with the lower arm 21. The balancer 10 extends and contracts in accordance with the pivoting action of the arm part 2. Due to this, a repulsive force F acts on the piston rod 12. The repulsive force F, as illustrated, becomes larger with turn of the arm part 2 to the front and rear from the state where the arm part 2 stands in the vertical direction. Due to this, the balancer device 110 generates a torque due to the repulsive force F in a direction opposite to the direction of the load (torque) which acts on the pivot shaft 4 due to gravity and assists the drive force of the servo motor 5.

Such a gas spring type of balancer 10 (gas balancer) comprised of a cylinder 11 in which a gas is sealed enables realization of smaller size and lighter weight compared with a coil spring type of balancer comprised of a cylinder in which a coil spring is inserted, and enables the apparatus as a whole to be configured more compactly. That is, a gas spring can generate a large output regardless of being relatively small in size and light in weight, so a gas balancer can generate a large auxiliary torque by a compact mechanism. Therefore, this can be suitably used for a robot which is light in weight, compact, and can carry large weights.

In this regard, when the arm part 2 pivots, if the balancer 10 becomes the natural length state of FIG. 2A, i.e., if the piston 12a touches the end wall of the cylinder 11, an excessive load will occur at the balancer 10 and the balancer 10 is liable to be damaged. For this reason, the balancer 10 is attached to the robot in the state made to contract by a predetermined amount so that the piston 12a will not contact the end wall of the cylinder 11 when the arm part 2 pivots. However, in the state where gas 14 is sealed in the cylinder 11, the balancer 10 in the natural length state generates a repulsive force F1, so it is difficult to cause the balancer 10 to contract to the attachment position against the repulsive force F1.

On the other hand, it may also be considered to attach the balancer 10 to the robot in the state where no gas 14 is sealed in or in the state where the amount of gas 14 sealed in is slight, then seal in the gas 14 from the outside through a gas sealing device. However, in this case, for example, it would be necessary to separately prepare a gas injecting device each time replacement and detachment of the gas spring, etc., are carried out for maintenance and inspection of the robot, etc. This would be troublesome. Therefore, the present embodiment is configured as follows so as to enable the balancer 10 to be easily attached to the robot in the state where gas 14 is sealed in.

Figure 3:
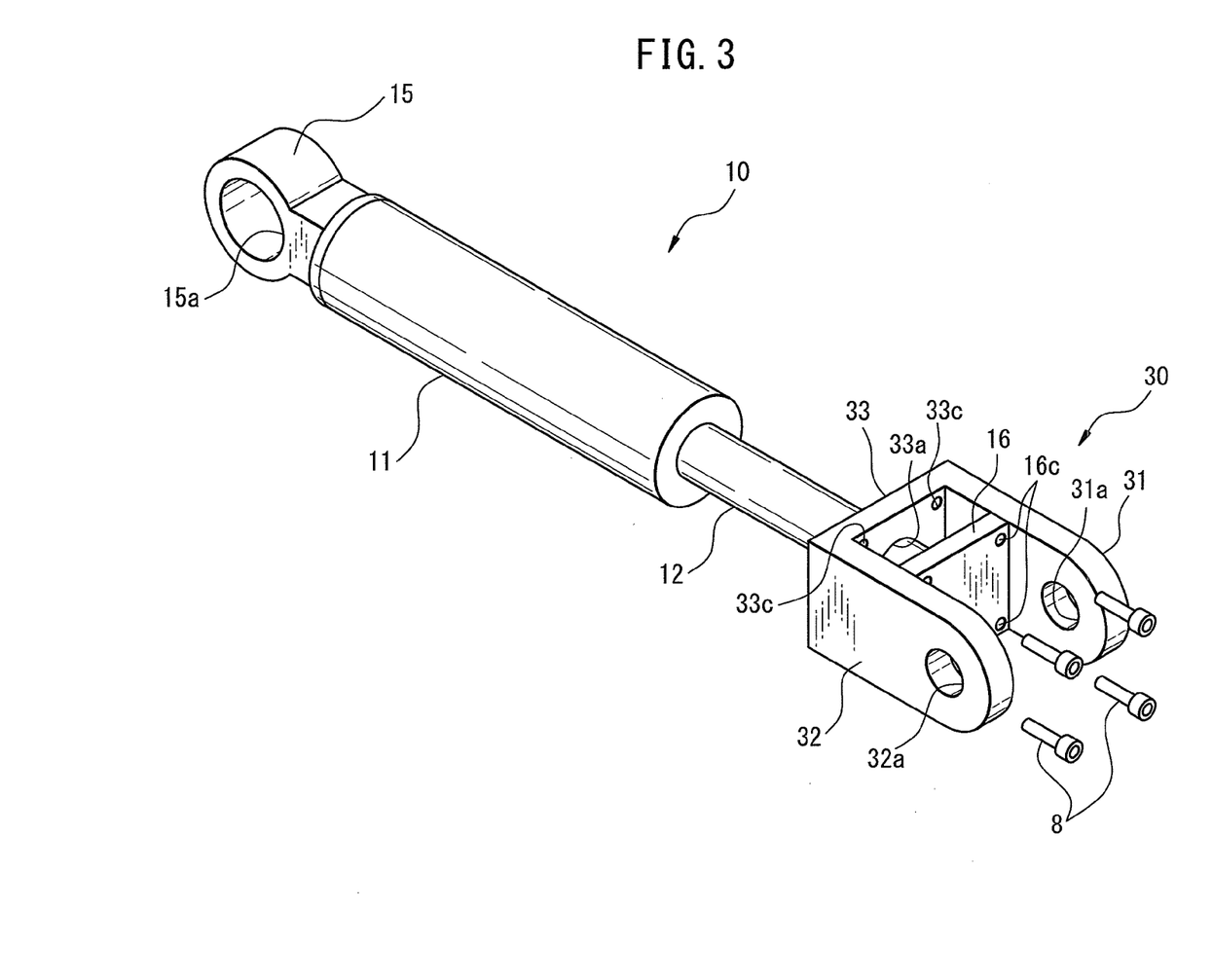
FIG. 3 is a perspective view which shows the appearance and configuration of a balancer device according to the first embodiment of the present invention.
Figure 4:
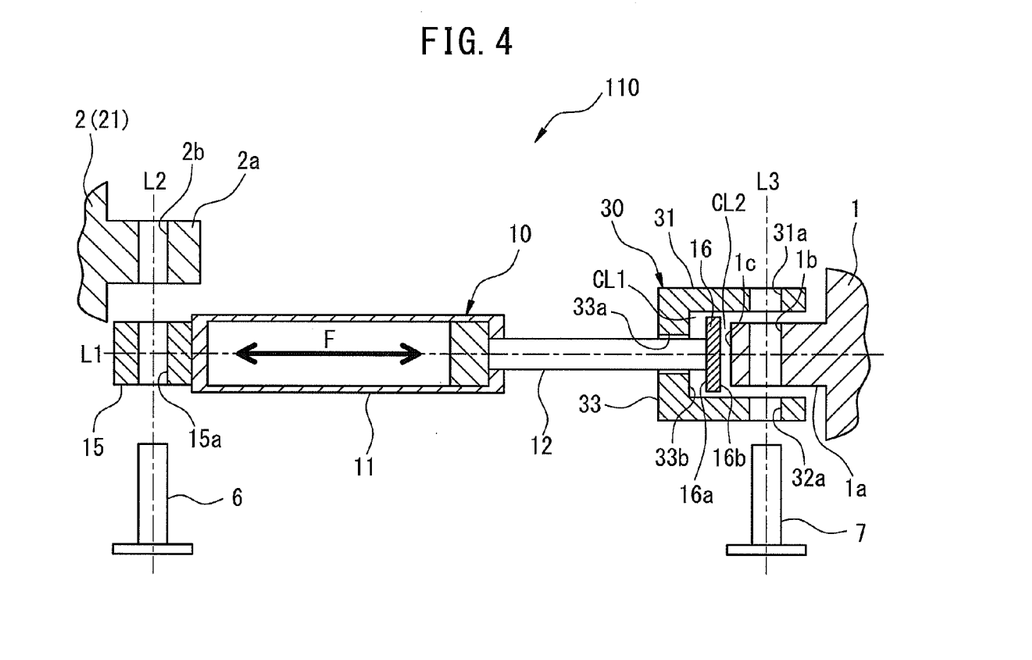
FIG. 4 is a cross-sectional view which shows a state of attachment of the balancer according to the first embodiment of the present invention.

FIG. 3 is a perspective view which shows the appearance and configuration of the balancer device 110 according to the first embodiment, while FIG. 4 is a cross-sectional view of the balancer device 110 which shows the state of attachment of the balancer 10. As shown in FIG. 3 and FIG. 4, one end part of the balancer 10 at the cylinder side is provided with a coupling part 15 which is formed with a through hole 15a along an axial line L2 perpendicular to the axial line L1. The arm part 2 (lower arm 21) is provided with a support part 2a sticking out from it, while the support part 2a is formed with a through hole 2b. A pin 6 is inserted along the axial line L2 in the through hole 2b and the through hole 15a. One end part of the balancer 10 is pivotably supported through the pin 6 at the support part 2a. A rectangular-shaped plate 16 which extends vertical to the axial line L1 is fastened to the other end part of the balancer 10 at the rod side. a cross-sectional U-shaped coupling member 30 is arranged around the plate 16. The coupling member 30 configures the balancer device 110 together with the balancer 10.

The coupling member 30 integrally has a pair of flat plate parts 31 and 32 which extend parallel to the axial line L1 and face each other and a flat plate part 33 which is perpendicular to the flat plate parts 31 and 32 and connects the end parts of the flat plate parts 31 and 32 at the cylinder 11 sides. The flat plate parts 31 and 32 are arranged straddling the plate 16 at its two sides. The front end parts of the flat plate parts 31 and 32 are formed with through holes 31a and 32a along the axial line L3 perpendicular to the axial line L1. The base part 1 is provided with a support part 1a sticking out from it, while the support part 1a is formed with a through hole 1b. A pin 7 is inserted along the axial line L3 in the through holes 31a and 32a and the through hole 1b. The coupling member 30 is pivotably supported at the support part 1a via the pin 7.

The center part of the flat plate part 33 is formed with a through hole 33a parallel with the axial line L1. The front end part of the piston rod 12 passes through the through hole 33a. The piston rod 12 can therefore move relative to the coupling member 30 in the axial line L1 direction. As shown in FIG. 4, in the natural length state of the balancer 10, there is a clearance CL1 between one end face 16a of the plate 16 (cylinder side end face) and the end face 33b of the flat plate part 33 which faces the end face 16a, while there is a clearance CL2 between the other end face 16b of the plate 16 and the end face 1c of the support part 1a which faces the end face 16b.

As shown in FIG. 3, the plate 16 is larger than the through hole 33a and is formed with through holes 16c near the four corners of the plate 16. Corresponding to these through holes 16c, the flat plate part 33 is provided with a plurality of threaded holes 33c. Bolts 8 passing through the through holes 16c are screwed in the threaded holes 33c. Due to the fastening force of the bolts 8, the end face 16a of the plate 16 and the end face 33b of the flat plate part 33 are made to abut against each other. Due to this, the balancer 10 is compressed against the repulsive force F of the gas 14.

The procedure for attachment of the balancer device 110 in the first embodiment will be explained next. The balancer 10 has a gas 14 sealed in it in advance. The balancer 10 is made the natural length state due to the repulsive force F of the gas 14. Further, for example, the piston rod 12 is inserted through the through hole 33a of the flat plate part 33, then the plate 16 is fastened to the front end part of the piston rod 12, whereby the coupling member 30 is connected with the balancer 10. The flat plate part 33 may be cut along the plane including the axial line L1 to form a pair of split structures. The split structures of the flat plate part 33 are fastened together so as to clamp the piston rod 12 to which the plate 16 is fastened between the pair of split structures, and thus the balancer 10 and the coupling member 30 are connected.

In this state, the pin 6 is inserted through the through hole 15a of the coupling part 15 of the balancer 10 into the through hole 2b of the support part 2a so as to support one end part of the balancer 10 at the arm part 2 pivotably about the axial line L2. Furthermore, the pin 7 is inserted through the through holes 31a and 32a of the coupling member 30 into the through hole 1b of the support part 1a so as to support the other end part of the balancer 10 at the base part 1 pivotably about the axial line L3 through the coupling member 30. At this time, the balancer 10 is in the natural length state, so there are clearances CL1 and CL2 at the two sides of the plate 16. For this reason, when attaching the balancer 10 to a robot (base part 1 and arm part 2), there is no need to apply a compressive force to the balancer 10 from the outside and attachment of the balancer 10 to the robot 100 is easy. The coupling member 30 can rotate relative to the piston rod 12 about the axial line L1, so positioning of the coupling member 30 in the rotational direction about the axial line L1 (phase matching) is also easy. The above operation of attachment of the balancer 10 to the robot 100 is, for example, carried out in the state with the pivot angle of the arm part 2 (arm angle) fixed to a predetermined angle.

Figure 5A:
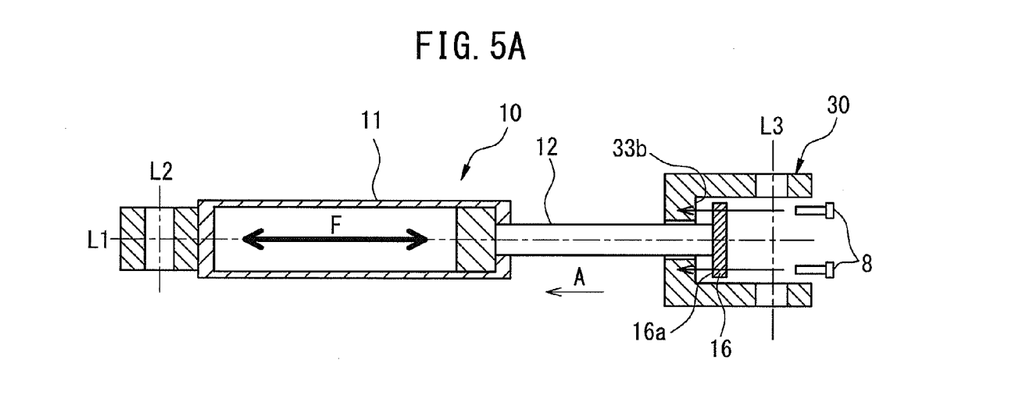
FIG. 5A is a view which shows a procedure for attachment of the balancer according to the first embodiment of the present invention.
Figure 5B:
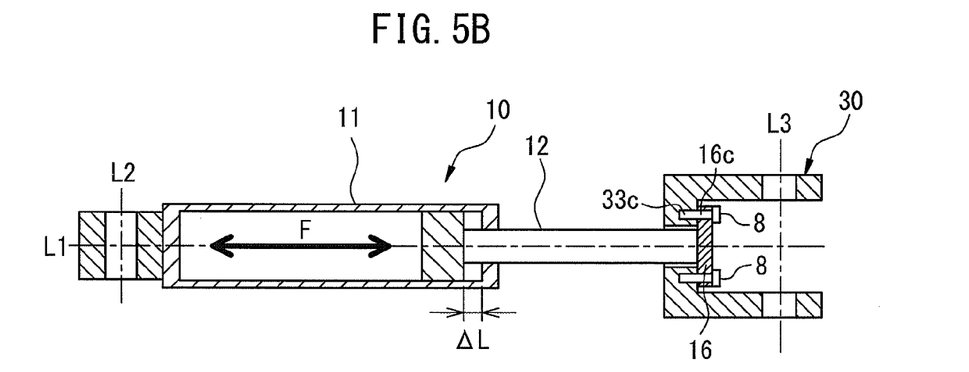
FIG. 5B is a view which shows a procedure for attachment of the balancer according to the first embodiment of the present invention.

Next, as shown in FIG. 5A, bolts 8 are inserted into through holes 16c of the plate 16 (FIG. 3) and the bolts 8 are screwed into the threaded holes 33c of the coupling member 30. Due to this, the piston rod 12 moves in the arrow "A" direction against the repulsive force F of the gas 14 and the balancer 10 contracts. As shown in FIG. 5B, if the fastening force of the bolts 8 causes the end face 16a of the plate 16 and the end face 33b of the coupling member 33 to abut against each other, the piston rod 12 is pushed in from the natural length state by exactly a predetermined amount ΔL. Due to this, the balancer 10 is set in the state of use and the work of attaching the balancer 10 is completed.

the bolts 8 are screwed in, for example, in the range of pivoting action of the arm part 2 and in the state where the arm part 2 is made to pivot to the arm angle where the balancer 10 extends the most. Due to this, the amount of movement of the piston rod 12, i.e., the amount of screw-in of the bolts 8, can be kept to a minimum and the work of attachment of the balancer 10 becomes much easier. When detaching the balancer 10 from the robot, it is sufficient to proceed by a procedure opposite to the one explained above.

According to the above first embodiment, the following such actions and effects can be exhibited.
(1) Since the piston rod 12 of the balancer 10 is inserted into the through hole 33a of the coupling member 30, the plate 16 is provided at the end part of the piston rod 12, the coupling member 30 is pivotably attached to the support part 1a of the base part 1, and the bolts 8 are used to fasten the plate 16 and the coupling member 30, the piston rod 12 is pushed into the cylinder 11 by a predetermined amount ΔL. Due to this, the gas spring type of balancer 10 can be attached to the robot 100 in the state extended to the maximum. Therefore, at the time of attachment of the balancer 10, there is no need to push in the piston rod 12 against the repulsive force F of the gas 14, and attachment of the balancer 10 to the robot 100 is easy. Further, by screwing the bolts 8 after attaching the balancer 10 to the robot 100, it is possible to be easily set the balancer 10 to the usage state.
(2) The coupling member 30 has a through hole 33a which movably supports the plate 16 in the direction of extension and contraction of the balancer 10 and through holes 31a and 32a in which a pin 7 passing through the support part 1a of the base part 1 is inserted so as to be able to pivot together with the balancer 10. This coupling member 30 is configured in a cross-sectional U-shape due to the flat plate parts 31 to 33, so, for example, can be easily and inexpensively configured by bending a thick-gauge plate member.
(3) The plate 16 and the coupling member 30 are fastened by bolts 8, so a large fastening force can be generated. Therefore, the piston rod 12 can be easily pushed in by a predetermined amount ΔL, resisting the repulsive force F of the gas 14. Further, the bolts 8 can be easily screwed into the threaded holes 33c of the coupling member 30 by using a wrench, spanner, or other general tool.
(4) The cylinder 11 and the coupling member 30 are rotatable relative to each other about the axial line L1. Therefore, the positioning of the coupling part 15 with respect to the support part 2a of the arm part 2 at the time of insertion of the pin 6 and the positioning of the coupling member 33 with respect to the support part 1a of the base part 1 at the time of insertion of the pin 7 can be easily performed.
(5) The fastening surfaces constituted by the end face 16a of the plate 16 and the end face 33b of the coupling member 30 are formed vertical to the direction of extension and contraction of the balancer 10 and the bolts 8 are screwed in along the direction of extension and contraction of the balancer 10. Due to this, the fastening force of the bolts 8 resists the repulsive force of the gas 14 with little loss, so it is possible to easily connect the coupling member 30 and the end part of the piston rod 23 (plate 26) against the repulsive force F of the gas 14.

Figure 6:
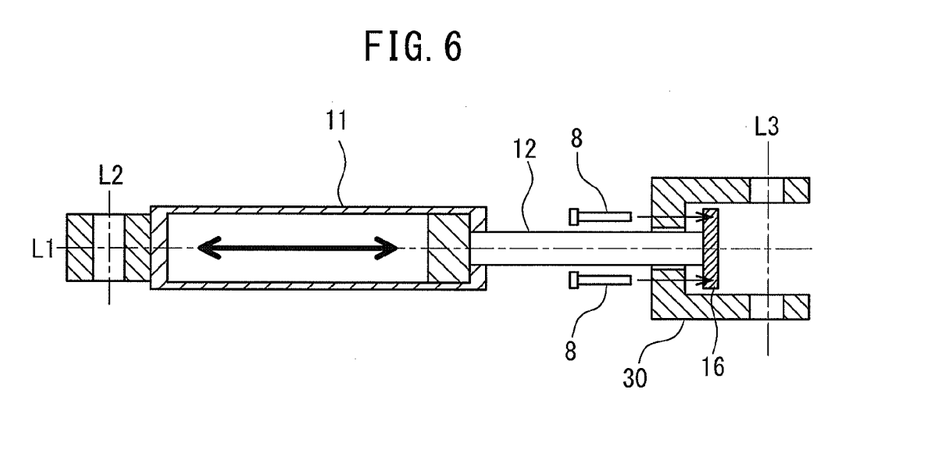
FIG. 6 is a view which shows a modification of FIG. 5A.

Above, the plate 16 is provided with through holes 16c, the coupling member 30 is provided with threaded holes 33c (female threads), and the plate and the coupling member are fastened. However, the mode of fastening the plate 16 and the coupling member 30 is not limited to this. For example, as shown in FIG. 6, it is also possible to provide through holes in the coupling member 30 and threaded holes (female threaded parts) in the plate 16, screw the bolts 8 into the threaded holes of the plate 16 from the coupling member 30 side, and thereby fasten the plate 16 and the coupling member 30. In this case, compared with FIG. 5A, the direction of insertion of the bolts 8 is opposite and, in the outside space of the coupling member 30, the bolts 8 are screwed in, so handling of the tools is easy.

Second Embodiment

Figure 7:
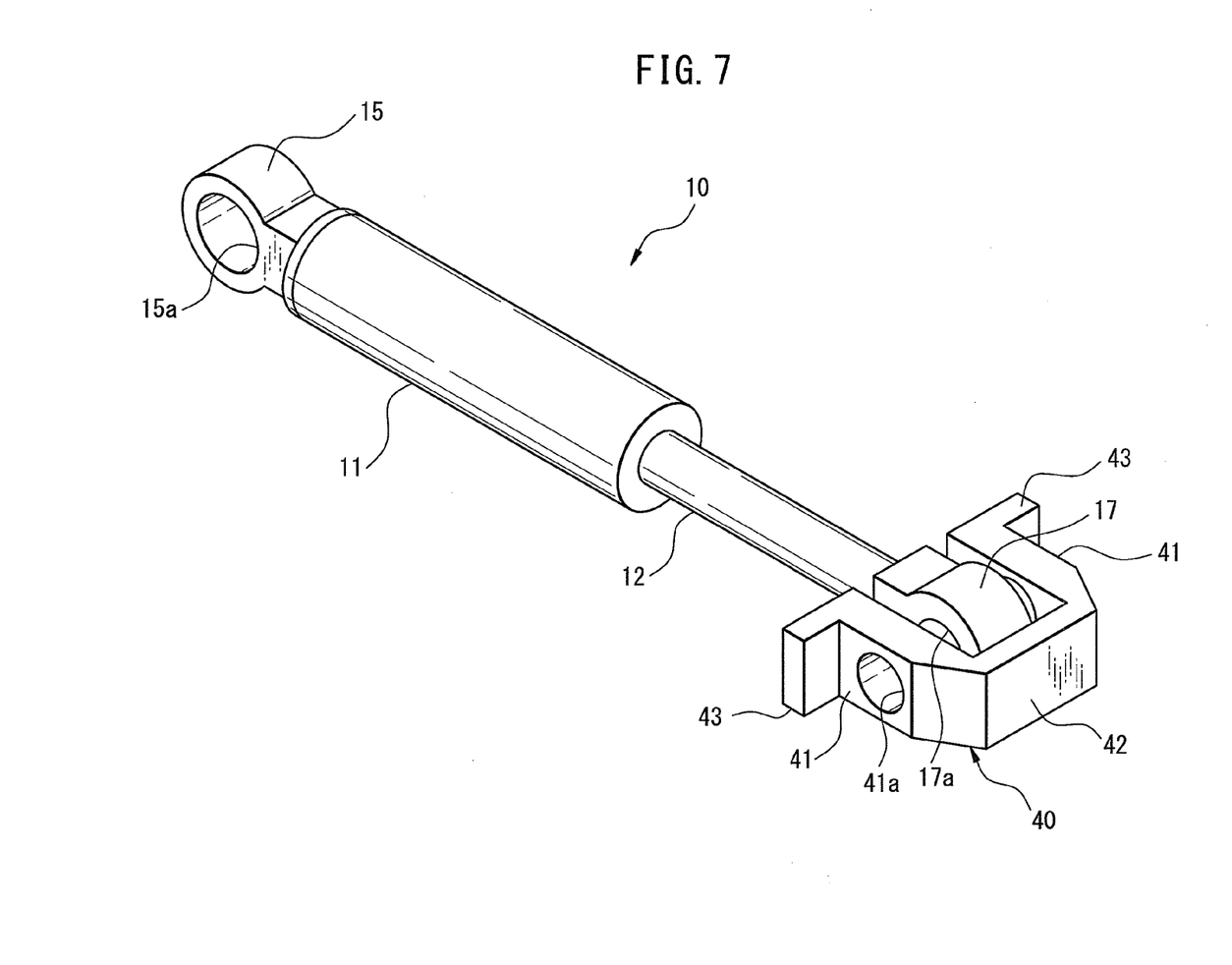
FIG. 7 is a perspective view which shows the appearance and configuration of a balancer device according to a second embodiment of the present invention.
Figure 8:
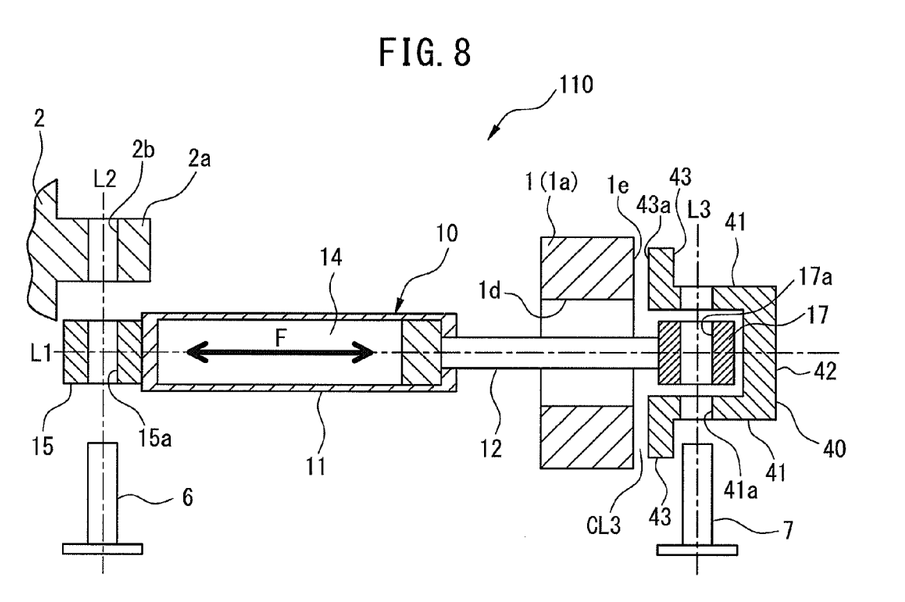
FIG. 8 is a cross-sectional view which shows a state of attachment of the balancer according to the second embodiment of the present invention.

Referring to FIG. 7 and FIG. 8, a second embodiment of the present invention will be explained. The second embodiment differs from the first embodiment in the attachment structure of the balancer 10 at the front end part of the piston rod 12. Below, the points of difference from the first embodiment will mainly be explained.

FIG. 7 is a perspective view which shows the appearance and configuration of a balancer device 110 according to the second embodiment of the present invention, while FIG. 8 is a cross-sectional view of the balancer device 110 which shows the state of attachment of the balancer 10. The same portions as shown in FIG. 3 and FIG. 4 are assigned the same reference notations. As shown in FIGS. 7 and 8, the front end part of the piston rod 12 is provided with a coupling part 17 instead of the plate 16. The coupling part 17 is formed with a through hole 17a vertical to the axial line L1. A coupling member 40 is arranged around the coupling part 17. The coupling member 40 configures the balancer device 110 together with the balancer 10.

The coupling member 40 has a pair of flat plate parts 41 which extend in the axial line L1 direction and face each other, a flat plate part 42 which connects the end parts of the pair of flat plate parts 41 at the side opposite to the cylinder 11, and a flange part 43 which extends from the end parts of the pair of flat plate parts 41 at the cylinder 11 side parallel to the axial line L3. The pair of flat plate parts 41 are arranged at the two sides of the coupling part 17, while the flange part 43 extends to the outside of the coupling part 17 (direction away from axial line L1). The pair of flat plate parts 41 are formed with through holes 41a vertical to the respective axial line L1. A pin 7 is inserted along the axial line L3 in the through holes 41a and the through hole 17a of the coupling part 17. Due to this, the coupling member 40 is pivotably connected with the end part of the balancer 10.

As shown in FIG. 8, the support part 1a of the base part 1, for example, exhibits a U-shape with an open top. The support part 1a therefore has an opening part 1d. The piston rod 12 is inserted into this opening part 1d. The front end part of the piston rod 12 sticks out from the end face 1e of the support part 1a through the opening part 1d. The support part 1a of the base part 1 may also be formed with a through hole which is larger than the coupling part 17 and the front end part of the piston rod 12 may be passed through the through hole and stick out from the end face 1e of the support part 1a. When the balancer 10 is in the natural length state, there is a clearance CL3 between the end face 43a of the flange part 43 of the coupling member 40 and the end face 1e of the support part 1a which faces the end face 43. While illustration is omitted, the flange part 43 is provided with through holes parallel to the axial line L1. Corresponding to the through holes, the support part 1a is provided with threaded holes (female thread parts). Not shown bolts are inserted into the through holes of the flange part 43 and the bolts are screwed into the threaded holes of the support part 1a. Due to this, the fastening force of the bolts causes the end faces 1e and 43e to abut whereby the balancer 10 is compressed against the repulsive force F of the gas 14.

The procedure for attachment of the balancer device 110 in the second embodiment will be explained next. The balancer 10 has a gas 14 sealed in it in advance. The balancer 10 is made the natural length state due to the repulsive force F of the gas 14. In this state, the pin 6 is inserted in the through hole 2b of the support part 2a through the through hole 15a of the coupling part 15 of the balancer 10 and one end part of the balancer 10 is supported at the arm part 2 pivotably about the axial line L2. Further, in the state with the other end part of the balancer 10 sticking out through the opening part 1d of the base part 1, a pin 7 is inserted in the through hole 17a of the coupling part 17 through the through hole 41a of the coupling member 40 and the coupling member 40 is pivotably connected with the end part of the balancer 10 through the pin 7.

Next, bolts are screwed into the threaded holes of the support part 1a of the base part 1 through the through holes of the flange part 43 of the coupling member 40 to fasten the coupling member 40 to the support part 1a. Due to this, the piston rod 12 is pushed in against the repulsive force F of the gas 14 by exactly the amount of length of the clearance CL3 from the natural length state. With the above, the work of attachment of the balancer 10 is ended.

In this way, in the second embodiment, the coupling member 40 has a through hole 41a in which a pin 7 passing through the end part of the balancer 10 is inserted, and pivotably supports the balancer 10 with respect to the coupling member 40 which is fastened to the base part 1. That is, the coupling member 40 is not fastened integrally with the balancer 10, but is fastened integrally with the support part 1a. Further, the flange part 43 of the coupling member 40 is fastened by bolts to the support part 1a of the base part 1, so the piston rod 12 is pushed into the cylinder 11 by a predetermined amount. Due to this, a gas spring type of balancer 10 can be easily attached to the robot 100.

Modifications

Figure 9A:
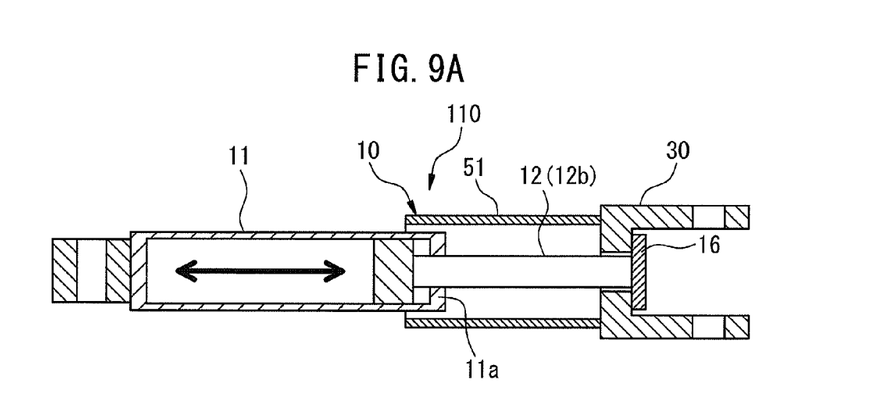
FIG. 9A is a view which shows an example of application of a protective member to a balancer.
Figure 9B:
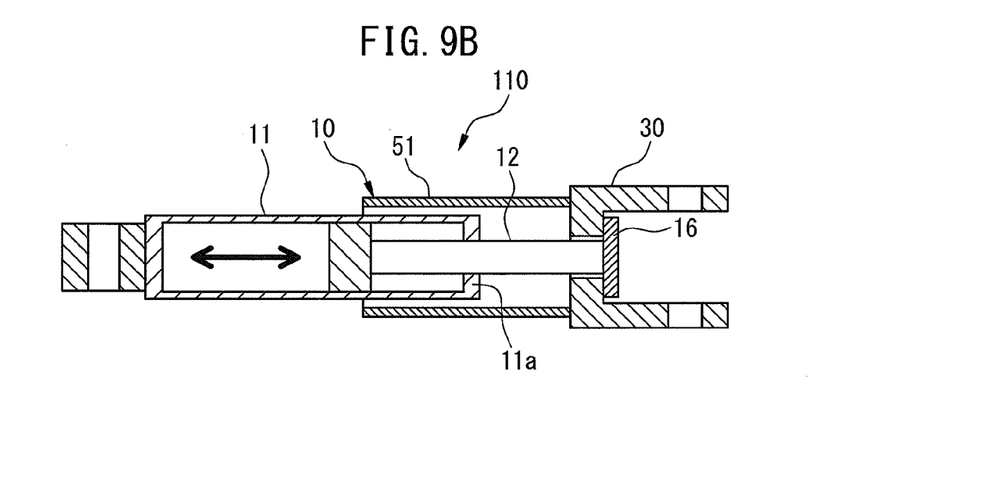
FIG. 9B is a view which shows a state where the balancer is made to contract from the state of FIG. 9A.

The periphery of the piston rod 12 of the balancer 10 explained above may also be covered by a protective member. FIG. 9A and FIG. 9B are views which show an example of a balancer device 110 which applies a protective member to the balancer 10 of the first embodiment. FIG. 9A shows the state where the balancer 10 extends to the maximum when the balancer device 110 is attached to the robot 100, while FIG. 9B shows the state where it is contracted to the maximum.

As shown in FIG. 9A and FIG. 9B, the protective member 51 exhibits a cylindrical shape of a diameter larger than the cylinder 11. One end part is fastened to the end face of the coupling member 30, while the other end part is arranged with a clearance from the outer circumferential surface of the cylinder 11. By providing the protective member 51 in this way, it is possible to prevent foreign matter, etc. from the outside sticking on the seal part which is provided at the sliding part of the rod 12b of the end part 11a of the cylinder 11. Due to this, the sealing performance of the cylinder 11 is secured and the durability of the balancer 10 can be improved. Further, since the protective member 51 is made larger in diameter than the cylinder 11, it is possible to avoid interference between the protective member 51 and the cylinder 11 at the time of extension and contraction of the balancer 10.

Figure 10A:
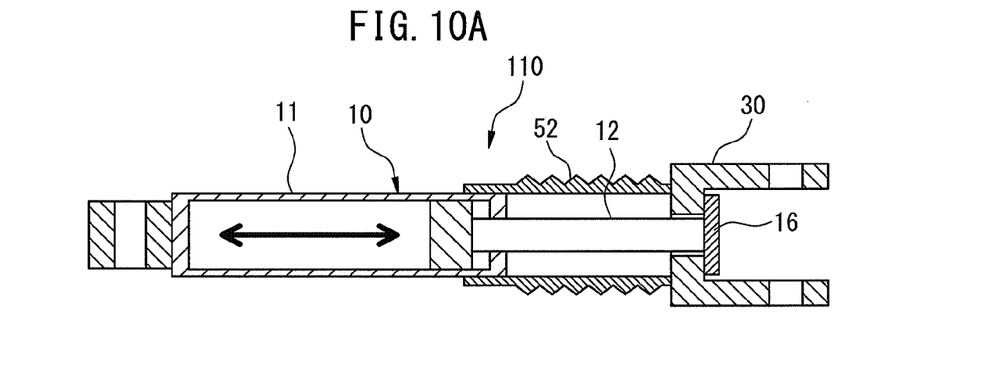
FIG. 10A is a view which shows a modification of FIG. 9A.
Figure 10B:
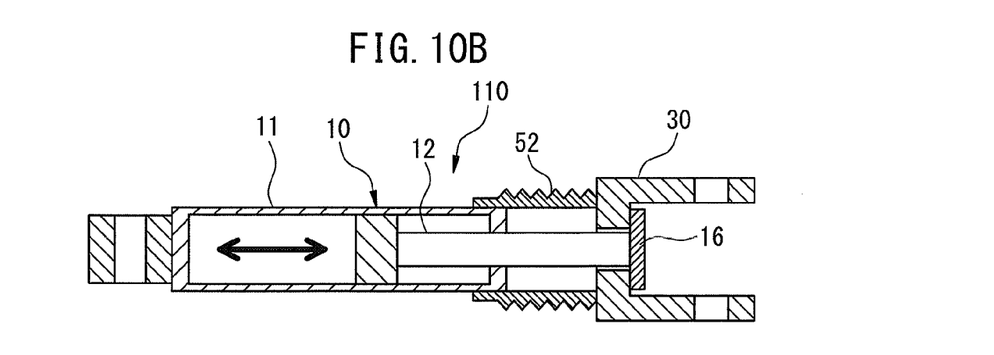
FIG. 10B is a view which shows a modification of FIG. 9B.

FIG. 10A and FIG. 10B are views which show a modification of FIG. 9A and FIG. 9B. The protective member 52 of FIG. 10A and FIG. 10B is, for example, configured in an accordion manner by a fabric material able to extend and contract. The inside diameter of the protective member 52 is substantially equal to the outside diameter of the cylinder 11. One end part of the protective member 52 is fastened to the end face of the coupling member 30, while the other end part is fastened to the outer circumferential surface of the cylinder 11. Due to this, the space surrounding the piston rod 12 is sealed and foreign matter can be reliably prevented from sticking to the piston rod 12. Further, the protective member 52 deforms to extend and contract at the time of extension and contraction of the balancer 10 without moving along the outer circumferential surface of the cylinder 11, so the protective member 52 can be configured compactly.

Figure 11A:
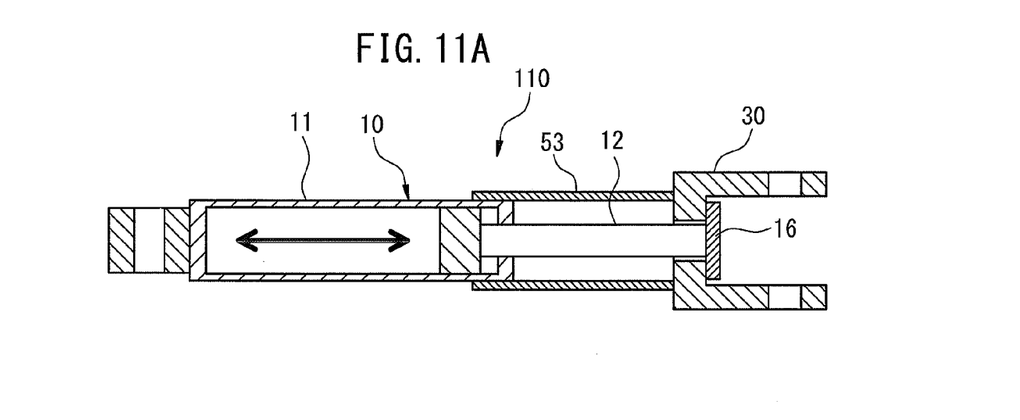
FIG. 11A is a view which shows another modification of FIG. 9A.
Figure 11B:
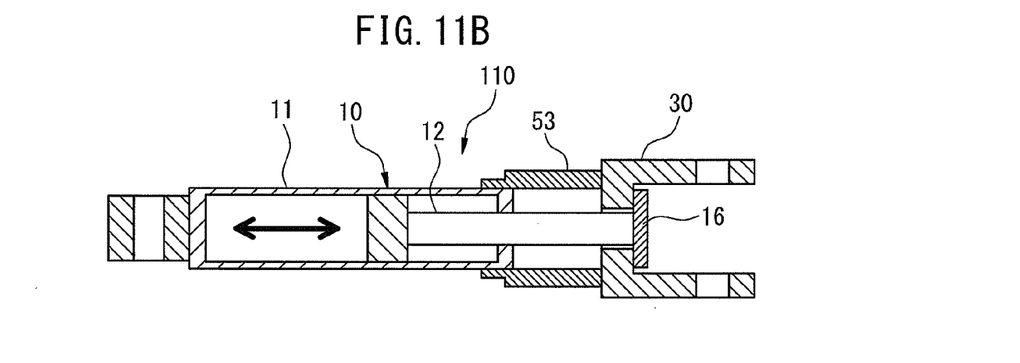
FIG. 11B is a view which shows another modification of FIG. 9B.

FIG. 11A and FIG. 11B are views which show another modification of FIG. 9A and FIG. 9B. The protective member 53 of FIG. 11A and FIG. 11B is made of rubber or another elastic material which can deform elastically. Further, in the same way as FIG. 10A and FIG. 10B, one end part of the elastic member 53 is fastened to the end face of the coupling member 30, while the other end part of the elastic member 53 is fastened to the outer circumferential surface of the cylinder 11. In this case, the elastic member 53 elastically deforms along with extension and contraction of the balancer 10 and the space surrounding the piston rod 12 is constantly sealed, so foreign matter can be reliably prevented from sticking on the piston rod.

In FIG. 9A to FIG. 11B, protective members 51 to 53 are applied to the balancer device 110 which has the coupling member 30. However, the protective members 51 to 53 may be similarly applied to the balancer device 110 which has the coupling member 40 (FIG. 8) as well. Therefore, the end parts of the protective members 51 to 53 may also be fastened to the support part 1a. In FIG. 9A and FIG. 9B, the protective member 51 is fastened to the coupling member 30, but it may also be fastened to the cylinder 11 and may be fastened to a part other than the balancer 10 as well. Further, so long as the end part 11a of the cylinder 11 can be protected, the protective member 51 need not cover the entire piston rod 12 and may cover only part of the piston rod 12 in the length direction. In FIG. 10A and FIG. 10B, so long as configured deformably in the direction of extension and contraction of the balancer 10, the protective member 52 may be configured by metal or various other materials as well. For example, the protective member 52 may also be made a telescopic structure.

In the above embodiments, bolts 8, i.e., screws are used as the fastening part which fastens the coupling member 30 and plate 16 and as the fastening part which fastens the coupling member 40 and support part 1a, respectively. By these screws, the end face 33b which is formed at the coupling member 30 (first end face) and end face 16a of the plate 16 (second end face) or the end face 43a which is formed at the coupling member 40 (first end face) and end face 1e which is formed at the support part 1a (second end face) is fastened. However, so long as fastening the first end faces which are formed at the coupling members 30 and 40 and the second end faces which are formed at the support part 1a (balancer support part) or plate 16 (balancer end part) and using the fastening force to push the piston rod 12 into the cylinder 11, parts other than screws may also be used to form the fastening parts.

Figure 12:
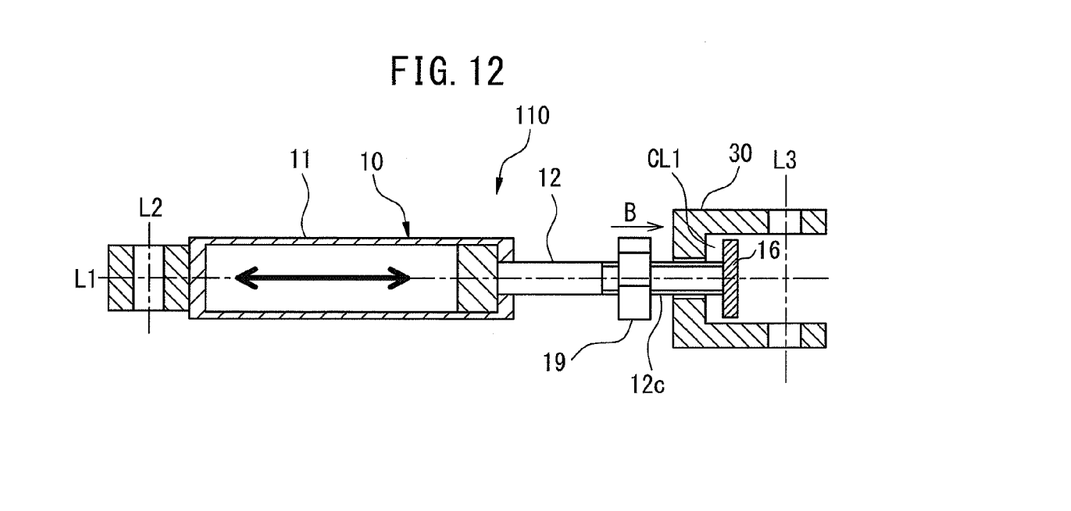
FIG. 12 is a view which shows a modification of FIG. 5A.

FIG. 12 is a view which shows one example of this. In FIG. 12, the front end side of the piston rod 12 is formed with a threaded part 12c. A nut 19 is screwed over the threaded part 12c. The nut 19 is turned to make it move in the arrow B direction of the figure and make the end face of the nut 19 abut against the end face of the coupling member 30, then the nut 19 is screwed in against the repulsive force of the gas 14. Due to this, the clearance CL1 between the plate 16 and the coupling member 30 is reduced and the plate 16 and the coupling member 30 are fastened.

In the above embodiments, the end part of the balancer device 110 at the cylinder side is pivatably connected with the arm part 2 and the end part on the piston rod side is pivatably connected with the base part 1 to be able to pivot. However, it is also possible to pivatably connect the end part on the cylinder side to the base part 1 and to pivatably connect the end part on the piston rod side to the arm part 2. In the above embodiments, the support part 1a of the base part 1 is used to form the balancer support part at which the balancer end part is supported through the coupling member. However, the support part 2a of the arm part 2 may also be used to form the balancer support part at which the balancer end part is supported through the coupling member. The balancer support parts of both the base part 1 and the arm part 2 may also be used to support the two end parts of the balancer 10 through the coupling member.

In the above first embodiment, the coupling member 30 is provided with a through hole 33a (movable support part) which movably supports the balancer end part (plate 16) in the direction of extension and contraction of the balancer 10 and through holes 31a and 32a (shaft insert parts) in which a pin 7 (shaft) passing through the support part 1a is inserted, and the coupling member 30 is configured to be pivatable integrally with the balancer 10. Further, in the above second embodiment, the coupling member 40 is provided with a through hole 41a (shaft insert part) in which a pin 7 passing through the coupling part 17 (balancer end part) is inserted, and the balancer 10 is configured to be pivotable with respect to the coupling member 40 fastened to the support part 1a. However, so long as being attached to the balancer support part 1a or 2a to support pivatably at least one of the end parts of the cylinder 11 and piston rod 12 constituting the balancer end part with respect to the balancer support part, the coupling member may be configured in any way. Although the plate 16 is made rectangular in shape, the plate part may be any shape so long as larger than the through hole 33a.

In the above embodiments, a gas spring type of balancer 10 comprised of a cylinder in which a compressible gas 14 is sealed is used. However, it is also possible to use a coil spring type of balancer comprised of a cylinder in which a coil spring is inserted. That is, the balancer 10 according to the present embodiment has the inside of the cylinder 11 sealed, so this can be used as various types of balancers. The general applicability is high.

The above embodiments may be combined with one or more of the above modifications.

According to the present invention, a coupling member which pivotably supports an end part of a balancer with respect to a balancer support part of a base part or arm part is provided, the coupling member and the balancer support part or end part of the balancer are fastened together to push a piston rod inside a cylinder by the fastening force. Due to this, it is possible to easily attach a gas cylinder type of balancer to a robot.

Above, the present invention was explained in relation to preferred embodiments, but a person skilled in the art would understand that various corrections and changes may be made without departing from the scope of disclosure of the later set forth claims.

The invention claimed is:
1. An industrial robot comprising:
a base part;
an arm part connected pivatably through a pivot shaft to the base part; and
a balancer device having one end part connected pivatably to the base part and the other end part connected pivatably to the arm part to apply a repulsive force resisting a load acting on the pivot shaft due to gravity, wherein
the base part and the arm part respectively have balancer support parts, and
the balancer device comprises:

a balancer having a cylinder and a piston rod to which a repulsive force is applied from inside the cylinder;

a coupling member attached to at least one of the balancer support parts to support pivotably at least one of end parts of the cylinder and the piston rod constituting a balancer end part with respect to the balancer support part; and a fastening part including a plate attached to the end of the piston rod, the plate pushing the piston rod inside the cylinder in response to a fastener applying a fastening force to the plate when an end face of the plate and an end face of the coupling member are physically separated due to repulsive force applied by cylinder, the fastening force applied by the fastener pushing the piston rod inside the cylinder to abut the end face of the plate with the end face of the coupling member.

2. The industrial robot according to claim 1, wherein the balancer is a gas spring balancer where a compressible gas is sealed inside the cylinder.

3. The industrial robot of claim 2, wherein the balancer is couplable to the base part and arm part without an application of a compression force to the balancer.

4. The industrial robot according to claim 1, wherein the fastening part has a screw.

5. The industrial robot according to claim 4, wherein the end face of the coupling member and the end face of the plate are respectively formed vertical to a direction of extension and contraction of the balancer, and the screw is screwed along the direction of extension and contraction of the balancer.

6. The industrial robot according to claim 1, wherein the end face of the plate is formed at the balancer support part, and the coupling member has a shaft insert part in which a shaft passing through the balancer end part is inserted so that the balancer is pivotable with respect to the coupling member fastened to the balancer support part.

7. The industrial robot according to claim 1, wherein the second end face of the plate is formed at the balancer end part, and the coupling member has
   a movable support part supporting movably the balancer end part in a direction of extension and contraction of the balancer, and
   a shaft insert part in which a shaft passing through the balancer support part is inserted so that the coupling member is pivotable integrally with the balancer.

8. The industrial robot according to claim 7, wherein the movable support part is a through hole through which the end part of the piston rod passes, and the balancer end part has the plate provided at the end part of the piston rod passing through the through hole, the plate being larger than the through hole, the plate forming the end face.

9. The industrial robot according to claim 1, wherein the balancer device further has a tubular protective member covering a periphery of the piston rod.

10. The industrial robot according to claim 9, wherein the protective member is configured deformably in a direction of extension and contraction of the balancer, and one end part of the protective member is fastened to an outer circumferential surface of the cylinder, while the other end part of the protective member is fastened to the balancer support part or the coupling member.

11. The industrial robot according to claim 9, wherein the protective member is comprised of an elastically deformable elastic material.

* * * * *